May 21, 1968     R. R. PERRON     3,384,021
ELECTROMAGNETIC RECIPROCATING FLUID PUMP
Filed Aug. 29, 1966     2 Sheets-Sheet 1

INVENTOR.
ROBERT R. PERRON
BY
Robert J. Schiller
ATTORNEY

INVENTOR.
ROBERT R. PERRON

United States Patent Office 3,384,021
Patented May 21, 1968

3,384,021
ELECTROMAGNETIC RECIPROCATING
FLUID PUMP
Robert R. Perron, Beverly, Mass., assignor to Arthur D. Little Inc., Cambridge, Mass., a corporation of Massachusetts
Filed Aug. 29, 1966, Ser. No. 575,705
2 Claims. (Cl. 103—53)

ABSTRACT OF THE DISCLOSURE

An electromagnetically driven, reciprocating, fluid pump having a movable cylinder, a pair of hollow, concentric cylindrical, magnetic pole pieces spaced apart to provided an annular flux gap in which the cylinder is movable, the inner pole piece constituting a fixed piston with respect to the cylinder. A coil is mounted on the cylinder and a coil is mounted for energizing the pole pieces, the two coils being inductively couplable with one another.

This invention relates to pumps, and more particularly to electromagnetic, reciprocating, fluid pumps.

In instances where the volume or rate of fluid pumping is not important but the space available for pumping equipment is sharply limited, the use of an individual pump and separate bulky motor is often precluded by the space limitation. Further, when one wishes to pump fluid along a hermetically sealed path, the mechanical coupling between a pump and motor presents a serious seal problem.

It is, therefore, a principal object of the present invention to provide a pump which is well adapted to miniaturization and which involves no mechanical motor-pump coupling, thereby obviating the above noted problems. Another object of the present invention is to provide means having a reciprocating member that is both the reciprocating armature of a motor and the piston of a fluid pump. Yet another object of the present invention is to provide such a pump having a cylinder and a piston, the latter having a valved opening operable to provide a fluid path between opposite ends of the cylinder, means for providing a first pair of magnetic poles at opposite ends of the piston, means for providing a second pair of magnetic poles distributed longitudinally along the cylinder to define a flux gap magnetically couplable with at least one of the first pair of poles, and means for alternately changing the polarities of each pole of one of the pairs of poles.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein:

FIG. 1 is a circuit diagram showing the electrical interconnection between elements of the embodiment of FIG. 1 and an electrical power source.

Figures 1, 2, 3, 4:
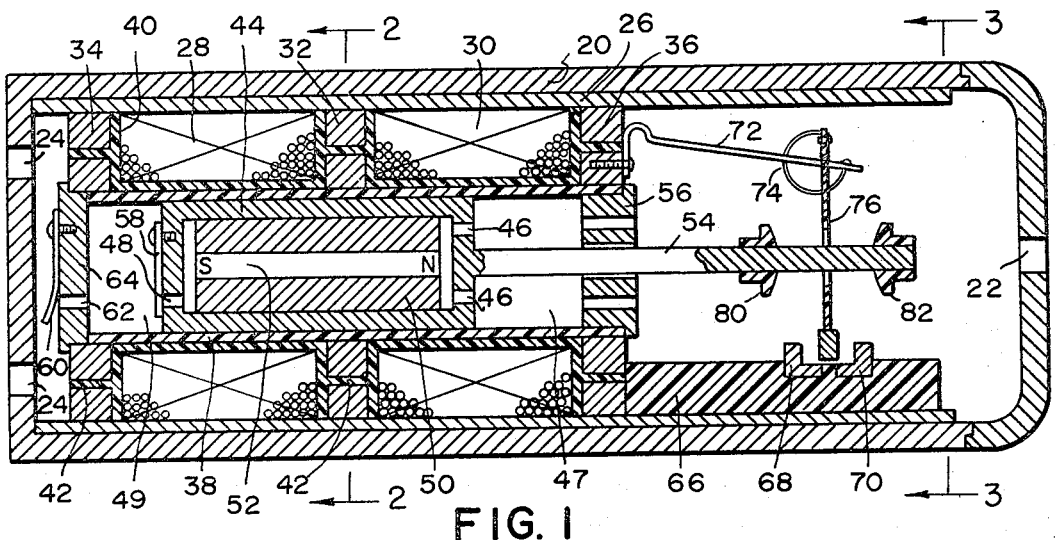
FIG. 1 is a schematic, cross-sectional view, partly broken away, taken along the longitudinal axis of an embodiment of the present invention.
FIG. 2 is a schematic, cross-section taken along the line 2—2 of FIG. 1.
FIG. 3 is a schematic, cross-section taken along the line 3—3 of FIG. 1.

Referring now to FIG. 1, the structure shown includes a substantially cylindrical, elongated hollow housing 20 having openings or entrance port 22 and exit ports 24 at opposite ends. Fluid conduits can be sealed to the ports thereby rendering the entire interior of the housing sealed with respect to the outside. Housing 20 can be a variety of strong, imporous materials which are preferably non-magnetic, e.g. diamagnetic, such as brass, synthetic polymeric plastic, stainless steel or the like. Mounted concentrically within and fitted to the interior wall of housing 20 is a hollow cylinder or tube 26 of low remanence, high susceptibility and permeability, ferromagnetic material such as soft iron.

Disposed within iron tube 26 are a pair of electrically conductive coils 28 and 30 each concentric with tube 26 and spaced from one another along the long axis of tube 26. Both coils abut median ring 32 of soft iron which is firm contact with tube 26. Closely adjoining the opposite ends of coils 28 and 30 respectively are similar rings of soft iron 34 and 36 also in contact with tube 26. It will be apparent that the soft iron rings constitute magnetic pole pieces for each coil to which they are adjoined, thus forming a pair of electromagnets having a flux path through tube 26 between pole piece pairs.

To provide electrical insulation and to lock the coils and pole pieces together, a layer 40 of epoxy resin is disposed between the coils and the pole pieces. Indeed, each of the latter contains a number of perforations 42 (as shown in FIG. 2) so that when the epoxy resin is applied, it can flow into interspaces between the coils and pole pieces and thence into the perforations, forming a solidly locked mass.

Fitted within the cylindrical hollow formed by rings 32, 34, and 36 and coils 28 and 30, is a thin hollow cylindrical liner 38 formed of a non-magnetic material preferably having a low coefficient of friction at its interior surface, typically polytetrafluoroethylene or the like.

Slidably fitted within liner 38 is a piston comprising hollow cylindrical enclosure 44 of non-magnetic material such as brass, having openings or vents 46 at one end and another vent 48 at its opposite end respectively opening into chambers 47 and 49 into which the piston divides the interior of the cylinder. Firmly affixed within enclosure 44 is core 50 of permanently magnetized material such as an "Alnico" alloy or the like, perforated from end to end as by passageway 52 to provide a fluid path between vents 46 and vent 48. Rigidly connected at one end of the piston and extending substantially along the longitudinal axis of housing 20 is switch actuating rod 54, also for example of brass. Perforated guide means 56 is provided at the appropriate end of liner 38 for supporting and maintaining the alignment of actuating rod 54.

Valve means are included for controlling flow through the piston so that fluid can flow through the piston but only in one direction, and in the form shown (in the closed position) is conveniently flapper valve 58 mounted across opening 48. Similarly, valve means are included for controlling fluid flow into or out of the cylinder in but one direction and is shown as flapper valve 60 (in its open position) mounted to cover opening 62 in plug 64 which is sealed across the end of liner 38 adjacent ports 24. It will be apparent that valves 58 and 60 are mounted to operate in alternation (i.e. when one is open, the other is closed and vice versa) by fluid pressures within the cylinder.

As switching means for alternating the activation of coils 28 and 30 there is provided within a portion of housing 20 not occupied by the coils, piston and liner, block 66 of insulating material such as polyvinylchloride. Mounted thereon are a pair of electrical contacts 68 and 70 each extending above the surface of block 66 and separated from one another electrically and also mechanically along a line parallel to the longitudinal axis of the housing. A pair of support members such as pins 72 are mounted, as on pole piece 36, and extend into the same portion of the housing parallel to one another. Hung between pins 72 on coil spring mounts 74 is switch armature 76 in the form shown as a flat metal sheet, e.g. of Phosphor bronze or beryllium copper. The unsupported end of the armature is normally biased by virtue of the spring mounts into a position intermediate contacts 68 and 70. Armature 76 has opening 78 therethrough and is also positioned such that rod 54 extends through opening 78. The latter is substantially greater in size than the diameter of rod 54, and preferably is an oval form with its major axis lying along the radius of rotation of the armature about the spring mounting. A pair of cams or buttons 80 and 82 are mounted on rod 54 adjacent opposite surfaces of armature 76 and dimensioned to be unable to pass through opening 78.

As shown in FIG. 4, armature 76 is movable into contact with either contact 68 or contact 70. The latter is connected to one side of coil 30, the other side of the coil being connectable to a terminal of DC power source such as battery 84. Similarly, contact 68 is connected to one side of coil 28, the other side of the latter being connectable to the same battery terminal. The other battery terminal is connectable to armature 76. To avoid unnecessary complications, these connections are shown only in FIG. 4. Importantly, coils 28 and 30, which are aligned along the common long axis of the device are connectable through armature 76 and the switch contacts so that when one is energized, the other is not, the direction of current flow being the same in both coils. Thus, the pole piece provided by ring 32 switches between opposite magnetic polarities when the respective coils are alternately energized.

To describe the operation of the device, one can assume as initial conditions that the piston is adjacent one end of liner 38 so that armature 76 is connected to contact 68 thus energizing coil 30, that magnet 50 has the polarity shown in FIG. 1, and that battery 84 of the circuit of FIG. 4 is poled so that when coil 30 is energized, ring 32 will provide a north magnetic pole. Thus, the north pole of magnet 50 is repelled by the pole at ring 32 and attracted by the south pole appearing at ring 36, while the south pole of magnet 50 is attracted by ring 32. This tends to force the piston toward the opposite end of liner 38, and as rod 54 moves axially, button 82 moves out of contact with armature 76. The inertia of the moving piston carries it into a position adjacent the other end of liner 38 wherein button 80 picks up the armature, breaking its connection with contact 68 and driving the armature into contact with contact 70. Coil 28 is now energized and rings 32 and 34 therefore become respectively south and north poles. Consequently, piston 44 is now impelled in the opposite direction toward the end of liner 38 from which it started. It is manifest that each piston pole always lies between the same pair of pole pieces associated with a corresponding coil, regardless of the position of the piston. Thus, the reciprocating motion of the piston is assured.

Magnet 50 and contact 76 do not ordinarily come to rest in a central position. When the coils are deenergized, the magnet usually will reside to the left or right because the flux through the rings and return flux path always tend to maximize. Hence, the magnet is in an unstable position when in the center and tend to "flip or flop." Armature contact 76 therefore is always in contact with either contact 68 or 70 so that the device is always ready to start (i.e. does not stop on dead center).

As the piston reciprocates from left to right with reference to FIG. 1, expanding the volume of cylinder chamber 49, valve 60 will be forced closed whilst valve 58 will open, both due to the differential air pressures established across the valves by the piston motion. Hence, air flows from chamber 47 through vents 46, passageway 52 and out through vent 48 into the interior of chamber 49. Now, upon reversal of the motion of the piston, air in chamber 49 starts to be compressed thereby closing valve 58 and forcing valve 60 open. As the piston moves to decrease the volume of chamber 49, the air in the latter is therefore forced out through ports 24.

The present invention is susceptible of a number of modifications without departing from the principles involved. For example, the location of the valves is not particularly critical, and other valve locations will be obvious to those skilled in the art. While switching of the coils is established mechanically in the present embodiment it will be apparent that other switching schemes can be employed. Typically, switching can be achieved through the use of a magnet mounted on the actuating rod to thereby move a magnetic armature rather than by physical contact as disclosed, or by the use of simple transistor circuitry which is controlled by electromagnetic pulses generated by a small magnet armature mounted on rod 54 and a pair of small fixed coils disposed around the armature.

Certain aspects are quite important, however. It is manifest from the foregoing description that the piston-cylinder arrangement constitutes both a pump and motor combined, having necessarily a reversible magnetic pole distributed between two opposite poles of fixed polarity. However, the fixed poles need not necessarily be associated and movable with the moving element or piston.

Figure 5:
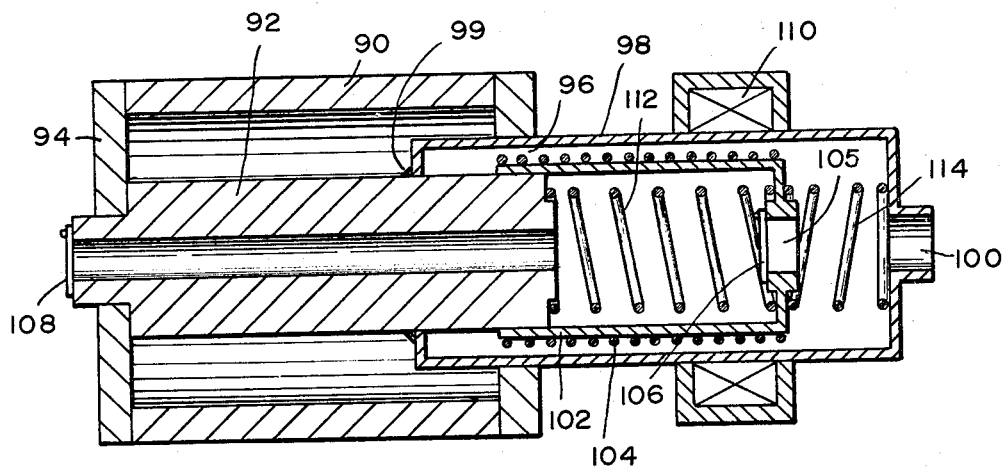
FIG. 5 is a schematic cross-sectional view taken along the longitudinal axis of yet another embodiment of the present invention.

In an alternative embodiment, the fixed poles can be distributed in spaced relation to the stationary element or cylinder, whilst the moving element or piston bears the reversible pole. This can rather easily be achieved as shown schematically in FIG. 5 by providing permanent magnetic pole pieces 90 and 92 in the form of two concentric hollow cylinders connected at one end of each through soft iron ring 94, thereby providing open, annular flux gap 96 between the other ends of the pole pieces. Hollow, cylindrical elongated enclosure 98 of non-magnetizable material such as brass, but preferably a non-conductive material such as a plastic, is mounted within flux gap 96, coaxially with inner cylinder or pole piece 92 so as to provide an annular clearance between the latter and enclosure 98. One end of enclosure 98 is sealed, as at 99, to an intermediate portion of pole piece 92, the other end of enclosure 98 being provided with port 100.

A hollow, cylindrical cylinder 102, preferably of electrically non-conductive material, is mounted with one end surrounding pole piece 92 such that cylinder 102 is movable along the long axis of the pole piece through flux gap 96. It will be seen that the cylinder is mobile here while the piston is static. Wound around cylinder 102 is coil 104 the ends of which are electrically short circuited to one another.

The unmounted end of cylinder 102 bears opening or vent 105 which is selectively closable by flapper valve 106. A similar flapper valve 108 is mounted, for example, across the hollow interior of pole piece 92. The two valves, as in the embodiment of FIG. 1, are arranged to operate alternatively by differential pressure.

Mounted about enclosure 98 adjacent the end thereof bearing port 100, and therefore spaced from the pole pieces, is induction coil 110 which is reversibly connectable to a source of DC power or connectable to an AC source. Coil 110 and cylinder 102 are arranged so that regardless of the position of cylinder 102, a portion of coil 104 is located adjacent coil 110. Spring means, shown at 112 and 114 are provided for normally resiliently biasing cylinder 102 into a position intermediate the extreme positions of its axial travel.

A periodically reversing or alternating current passed through coil 110 will induce transient currents reversibly in coil 104. With respect to that part of the coil within flux gap 96, the interaction of the current in coil 104 with the static magnetic flux between the pole pieces will, as is well known, drive coil 104 in alternate axial direction. Because the latter is fixed to cylinder 102, fluid trapped within the latter will therefore be driven through the interior of the pole piece 92, forcing valve 108 to open so that the fluid can escape therefrom. Of course, motion of the cylinder in the opposite direction results in valves 108 and 105 respectively being forced closed and open to recharge the interior of the cylinder.

Since certain changes may be made in the above apparatus without departing from the scope of the invention herein involved it is intended that all matter contained in the above description or shown in the accompanying drawing shall be interpreted in an illustrative and not in a limiting sense.

What is claimed is:
1. A reciprocating fluid pump, comprising in combination;
   an elongated hollow chamber having inlet and outlet ports spaced from one another;
   first valve means for controlling fluid flow through one of said ports;
   a permanent magnet having a pair of concentric hollow, cylindrical pole pieces separated adjacent one end of each by a flux gap and affixed to said chamber;
   a hollow cylinder mounted for movement along the inner of said pole pieces through said flux gap so that said inner pole piece constitutes a piston with respect to said cylinder;
   second valve means for controlling fluid flow through said hollow cylinder;
   a first electrically conductive coil having its ends short-circuited to one another, said coil being affixed to said cylinder so as to be axially movable with the latter in said flux gap; and
   a second electrically conductive coil affixed to said chamber substantially concentrically with at least a portion of said first coil so that the latter is inductively couplable with said second coil.

2. A pump as defined in claim 1 including means for energizing said second coil with a periodically reversing current.

References Cited

UNITED STATES PATENTS

| | | | |
|---|---|---|---|
| 3,116,695 | 1/1964 | Faller | 103—53 |
| 3,282,219 | 11/1966 | Blackwell et al. | 103—53 |

FOREIGN PATENTS

| | | |
|---|---|---|
| 338,046 | 11/1930 | Great Britain. |
| 350,667 | 6/1931 | Great Britain. |

ROBERT M. WALKER, *Primary Examiner.*